United States Patent Office 3,421,904
Patented Jan. 14, 1969

3,421,904
CHEESE, PHOSPHATE AND POLYGLYCERYL PARTIAL ESTER COMPOSITION
Charles W. Tatter, Homewood, and Peter P. Noznick, Evanston, Ill., assignors to Beatrice Foods Co., Chicago, Ill., a corporation of Delaware
No Drawing. Filed June 11, 1965, Ser. No. 463,374
U.S. Cl. 99—117               18 Claims
Int. Cl. A23c *19/12;* A23c *19/14*

ABSTRACT OF THE DISCLOSURE

Emulsified cheese compositions are prepared by admixing water, a water soluble nontoxic phosphate, a fermented type cheese and a polyglyceryl partial ester of a higher fatty acid. The product can be spray dried.

---

The present invention relates to an emulsified cheese product.

It is an object of the present invention to prepare smoother emulsified cheese products.

Another object is to prepare spray dried cheese products.

A further object is to delay the bodying time of emulsified cheese products.

Still further objects and the entire scope of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by mixing a fermented type cheese with a nontoxic phosphate, e.g. an ammonium, sodium or potassium phosphate, and a polyglycerol ester of a higher fatty acid as an emulsifying agent.

It is critical that there be employed the polyglycerol ester of a higher fatty acid since other emulsifying agents, e.g. propylene glycol monostearate and glycerol lacto monopalmitate are unsatisfactory and give a lumpy product on reconstitution in contrast to the very smooth product of the present invention.

If the cheese and phosphate mixture without the polyglycerol ester is spray dried and redispersed in water, a strong bodying is obtained immediately. However, when using the polyglycerol partial esters of higher fatty acids, a fluid product is obtained and bodying is much delayed. The product of the present invention can be used as such or it can be blended with other foods to make mixtures of enhanced flavor and stability.

If desired, there can be added cheese colorants such as Hansen's double strength cheese color, but this is not essential.

As the cheese there can be employed fermented cheeses such as cheddar cheese, blue cheese, Romano, Parmesian, Gorgonzola, Swiss Cheese, mozzeralla, cottage cheese, Limburger, brick, Gruyere, Liederkranz, and Tilster. The preferred cheese is cheddar cheese.

As the phosphate there can be used disodium phosphate, dipotassium phosphate, diammonium phosphate, sodium aluminum phosphate, sodium acid pyrophosphate, sodium tripolyphosphate, tetrasodium pyrophosphate, potassium polyphosphate, potassium poly metaphosphate, and other water soluble nontoxic phosphates.

The phosphate serves as a peptizing agent for the protein in the cheese and reacts with the same to break down the particle size thereof.

As the emulsifying agent there are used polyglycerol esters of fatty acids. While polyglycerol esters from diglycerol to triconta (30 glycerol units) glycerol esters of fatty acids can be employed there are preferably employed triglycerol to decaglycerol esters of higher fatty acids (e.g. containing 12 to 22 carbon atoms in the fatty acid). The most suitable polyglycerol esters are partial esters, i.e. they have one or more free hydroxyl groups hence have both hydrophilic and lipophilic characteristics.

Examples of suitable polyglycerol esters are triglycerol monostearate, triglycerol monoshortening (triglycerol mono ester of the acids of cottonseed oil), triglycerol monooleate, hexaglycerol monostearate, hexaglycerol monoshortening, hexaglycerol monooleate, hexaglycerol dioleate, hexaglycerol distearates, hexaglycerol dishortening, hexaglycerol hexaoleate, decaglycerol monostearate, decaglycerol monoshortening, decaglycerol monooleate, decaglycerol monolaurate, decaglycerol tristearate, decaglycerol tri shortening, decaglycerol trioleate, decaglycerol trilinoleate, decaglycerol decastearate, decaglycerol decaoleate, decaglycerol deca linoleate, decaglycerol tetraoleate, diglycerol monostearate, dodecaglycerol hexapalmitate, decaglycerol tripalmitate, decaglycerol di arachinate, triglycerol mono behenate, dodecaglycerol tri lignocerate, decaglycerol mono linolenate, hexaglycerol di ricinoleate, decaglycerol deca myristate, octadecaglycerol dodecastearates, decaglycerol tri ester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol ester deca ester of hydrogenated cottonseed oil acids.

The decaglycerol tri fatty acid esters, e.g. decaglycerol tristearate are especially preferred since they give emulsions having greater stability before spray drying as well as greater stability after reconstitution than do the decaglycerol deca fatty acid esters, e.g. decaglycerol decastearate.

If desired, other additives can also be present.

It is important that the polyglycerol ester be thoroughly melted in the aqueous mixture prior to homogenization in order to get a uniform product.

Unless otherwise indicated all parts and percentages are by weight.

The proportion of the solid materials usually is within the following range:

| | Parts |
|---|---|
| Cheese | 85–95 |
| Phophate | 1–10 |
| Polyglycerol fatty acid ester | 0.5–15 |

The product after homogenization usually has a pH slightly on the acid side, e.g. between 5.0 and 7.0.

The amount of water is not critical and the mixture prior to spray drying usually has 25–50% solids, preferably 30–40%.

The mixture is pasteurized under conventional conditions, e.g. at 145–160° F. for 20–30 minutes. Homogenization is usually at 1500–2500 p.s.i.

The polyglycerol partial higher fatty acid ester should be preliquified before adding to the aqueous mixture or it can be added as a finely divided solid at 145–160° F., for example, it is important that the polyglycerol ester be allowed to be melted prior to homogenization of the mixture to insure uniform dispersion.

EXAMPLE 1

| | Parts |
|---|---|
| Cheddar cheese solids | 94.0 |
| Di sodium hydrogen phosphate | 3.0 |
| Decaglycerol tristerate (Drewpol 10-3-S) | 2.0 |
| Hansen's double strength cheese color | 0.25 |

Water to make 33% solids.

The disodium phosphate was added to the water, then the cheddar cheese was slowly added while heating to 145–150° F., next the decaglycerol tristearate was added in a preliquified condition at 145–150° F. The mixture was then pasteurized at 150° F., for 25 minutes and then homogenized at 2000 p.s.i.

There was obtained a very smooth fluid product which had a pH of 6.0 and exhibited excellent stability (e.g. when chilled to 40° F. and allowed to stand overnight). The product was spray dried to give a powder which was readily reconstitutable with water, e.g. to form a 50% solids emulsion that was smooth and had good stability.

EXAMPLE 2

The procedure of Example 1 was repeated, but the Hansen's cheese color was omitted to give a stable emulsion similar to that in Example 1. The emulsion was spray dried as in Example 1 to give a readily water reconstitutable powder.

EXAMPLE 3

The procedure of Example 1 was repeated, but the decaglycerol tristearate was replaced by decaglycerol decastearate. The emulsion had a pH of 5.8. It was spray dried to give a water reconstitutable powder. However, the reconstituted solution, e.g. at 50% solids was not as stable as that of Example 1.

A small sample of the emulsion of Example 3 prior to spray drying was chilled to 40° F. and allowed to stand overnight. Some settling occurred which again was an indication of poorer stability of the product than that obtained in Example 1.

We claim:

1. A composition consisting essentially of a fermented type cheese, a nontoxic phosphate protein peptizing agent and a polyglycerol partial ester of a higher fatty acid as an emulsifying agent.

2. A composition according to claim 1 including water.

3. A composition according to claim 1 as a dried powder.

4. A composition according to claim 1 wherein the polyglycerol ester is a polyglycerol partial ester of a fatty acid having 12–22 carbon atoms.

5. A process of preparing a stable cheese emulsion consisting essentially of admixing water, a water soluble, nontoxic phosphate, a fermented type cheese and a polyglycerol partial ester of a higher fatty acid, said partial ester having been heated sufficiently to insure that it is in liquid condition prior to homogenization and pasteurizing and homogenizing said mixture.

6. A process according to claim 5 in which the cheese is cheddar cheese.

7. A process according to claim 6 including the step of spray drying said emulsion.

8. A process according to claim 5 including spray drying said emulsion.

9. A composition consisting essentially of cheddar cheese, a nontoxic phosphate peptizing agent for the cheese and a polyglycerol partial ester of a higher fatty acid.

10. A composition according to claim 9 comprising 85–95 parts cheese, 1–10 parts phosphate and 0.5–15 parts polyglycerol partial ester.

11. A composition according to claim 9 including water.

12. A composition according to claim 9 as a dried powder.

13. A composition according to claim 9 wherein the polyglycerol partial ester is a decaglycerol tri ester of a fatty acid having 12–22 carbon atoms.

14. A composition according to claim 13 wherein the partial ester is decaglycerol tristearate.

15. A composition comprising 85–95 parts of cheddar cheese, 1–10 parts of disodium phosphate and 0.5–10 parts of decaglycerol tristearate.

16. A composition according to claim 1 wherein the polyglycerol ester is decaglycerol tristearate.

17. A composition according to claim 16 in the form of a dried powder which is readily water reconstitutable to give a stable emulsion.

18. A process according to claim 5 wherein the partial ester is decaglycerol tristearate.

References Cited

UNITED STATES PATENTS

| 2,808,336 | 10/1957 | Kalish | 99—123 |
| 2,871,127 | 1/1959 | Barch | 99—117 |
| 3,215,532 | 11/1965 | Bassett | 99—203 |
| 3,230,090 | 1/1966 | Weiss | 99—123 |

LIONEL M. SHAPIRO, Primary Examiner.

D. M. NAFF, Assistant Examiner.

U.S. Cl. X.R.

99—54, 59, 122